(12) United States Patent
Vaccaro et al.

(10) Patent No.: US 8,230,175 B1
(45) Date of Patent: Jul. 24, 2012

(54) DATA THROUGHPUT OPTIMIZATION OF A STORAGE DEVICE HAVING SEQUENTIAL DATA ACCESS

(75) Inventors: Nicholas Vaccaro, San Jose, CA (US); Mostafa Kashi, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 291 days.

(21) Appl. No.: 11/200,721

(22) Filed: Aug. 9, 2005

(51) Int. Cl.
*G06F 12/00* (2006.01)

(52) U.S. Cl. ......... 711/129; 711/E12.036; 711/E12.041; 711/E12.049

(58) Field of Classification Search .................... 711/129
See application file for complete search history.

(56) References Cited

U.S. PATENT DOCUMENTS

| | | | | |
|---|---|---|---|---|
| 3,938,097 | A * | 2/1976 | Niguette, III | 711/128 |
| 5,043,870 | A * | 8/1991 | Ditzel et al. | 711/132 |
| 5,214,770 | A * | 5/1993 | Ramanujan et al. | 711/123 |
| 5,381,528 | A * | 1/1995 | Brunelle | 710/56 |
| 5,530,673 | A * | 6/1996 | Tobita et al. | 365/185.09 |
| 5,627,993 | A * | 5/1997 | Abato et al. | 711/143 |
| 5,640,349 | A * | 6/1997 | Kakinuma et al. | 365/185.33 |
| 5,745,728 | A * | 4/1998 | Genduso et al. | 711/126 |
| 5,978,868 | A * | 11/1999 | Maas | 710/52 |
| 6,370,622 | B1 * | 4/2002 | Chiou et al. | 711/146 |
| 6,418,489 | B1 * | 7/2002 | Mason et al. | 710/22 |
| 6,564,272 | B1 * | 5/2003 | Strongin et al. | 710/52 |
| 6,704,835 | B1 * | 3/2004 | Garner | 711/103 |
| 6,848,027 | B2 * | 1/2005 | Hotta et al. | 711/129 |
| 6,889,289 | B2 * | 5/2005 | Crook et al. | 711/118 |

OTHER PUBLICATIONS

Jim Handy; "The Cache Memory book: The authoritative reference on cache design"; Second Edition; Academic Press; pp. 44-47, 202, 206, and 216.*
David A. Patterson et al; "Computer Organization and Design: The Hardware/Software Interface"; Third Edition; Elsevier; 2005; pp. 370 and 374.*
Jim Handy, "The Cache Memory Book: The Authoritative Reference on Cache Design", Second Edition, 1998, pp. 90-91.*
Jim Handy, ("The Cache Memory Book: The Authoritative Reference on Cache Design"), Second Edition, 1998, pp. 12-13 and 44-45.*
Steven P. VanderWiel et al., (When Caches Aren't Enough: Data Prefetching Techniques), University of Minnesota, Jul. 1997, http://www.ece.cmu.edu/~ece548/localcpy/r7023.pdf.*
Jim Handy, "The Cache Memory Book: The Authoritative Reference on Cache Design", Second Edition, Academic Press, p. 28.*

* cited by examiner

*Primary Examiner* — Edward Dudek, Jr.
*Assistant Examiner* — Christopher Birkhimer

(57) ABSTRACT

A system and method optimizing data throughput to a processor from a storage device having sequential data access capabilities where the processor enables its data cache for memory operations involving the storage device. The system includes a processor coupled to the data storage device, e.g., a NAND flash memory. The processor establishes an address window used as a cache (CW) for reading data from the flash memory and also establishes a non-cacheable address window (NCW) for commands, address delivery and writes to the flash memory. The CW is sized to be larger than the processor data cache to ensure that reads from the flash memory always encounter a cache-miss so that read data is obtained directly from the flash memory. By reading through the CW from the flash memory, the processor takes advantage of bursting, pipelining and data prefetch efficiencies which significantly increase data throughput.

19 Claims, 8 Drawing Sheets

US 8,230,175 B1

DATA THROUGHPUT OPTIMIZATION OF A STORAGE DEVICE HAVING SEQUENTIAL DATA ACCESS

BACKGROUND OF THE INVENTION

1. Field of the Invention

Embodiments of the present invention relate to data throughput regarding a storage device and a processor device. More specifically, embodiments of the present invention relate to increasing data throughput between a microprocessor and a data storage device having sequential data access.

2. Related Art

Flash memory devices have become widely used as storage devices for many electronic systems, including consumer electronic devices. These non-volatile memory devices can store relatively large amounts of data while being relatively small in size. Flash memory device manufacturers have provided a variety of communication interface protocols for their devices to allow efficient signaling. However, some flash memory communication interfaces do not allow optimum data throughput between the memory device and a processor accessing data therefrom. More specifically, some flash memory devices are sequentially accessed devices, also known as serial block devices. These devices do not have a separate address bus. Instead, the desired address is loaded into the data bus and special commands indicate to the memory device that an address is present on the data bus. In read mode (also entered by a special command), this causes the flash memory to supply data onto the data bus starting at the loaded addresses and then incrementing through sequential addresses. The data is supplied at a strobe rate defined by various other timing signals, e.g., data output enable, etc., which may originate from the processor.

For instance, processors having a data cache typically increase data access performance by caching recently received data and then subsequently providing that data directly from the data cache when the processor requests it again, thereby avoiding delays associated with bus access requests and external device delays. However, when a processor enables its data cache for use in conjunction with the flash memory device described above, data coherency problems arise. In this configuration, when the processor begins to receive sequential data from the flash memory, its read pointer remains fixed to the start address that was loaded into the flash memory. This is the case because the flash memory has no address bus and may be "addressed" by the processor using a single address value. If the data cache is enabled, each subsequent read request, after the first one, would therefore involve a data cache hit because the same address is involved for each read. As a result, the data cache, and not the flash memory, would then keep supplying the first received data for each subsequent read cycle. In other words, after the first data was received from the flash memory, all other data would be ignored by the processor during the read transaction.

One solution to this problem is to disable the data cache during read operations from the flash memory. This solution is not desired because it introduces unwanted data latency. If the data cache is disabled, then the processor typically issues a bus access request in between receiving each byte of data from the flash memory. The instructions for reading the flash memory contents, in this case, are issued sequentially without pipelining and without data prefetch efficiencies. In short, this solution while eliminating the data coherency problems described above does not provide adequate data throughput for many applications and data block sizes.

Lastly, another solution to the above data coherency problem is to flush the data cache after each data is received from the flash memory. However, this solution is not desired because it eliminates the efficiencies provided by the data cache regarding other processor functions, e.g., with respect to other devices not involving the flash memory. Also, cache flushing adds more data latency because the processor consumes cycles to perform the flush and this flush must be performed after each data is received.

SUMMARY OF THE INVENTION

Accordingly, a system and method are described herein for optimizing data throughput between a processor and a storage device having sequential data access capabilities where the processor enables its data cache for flash operations. The system eliminates the data coherency problems described above while allowing the processor to take advantage of certain efficiencies provided by enabling the data cache, e.g., instruction pipelining, data prefetch and bursting efficiencies, which dramatically increase data throughput with respect to read operations involving the storage device.

The system includes a processor coupled to the data storage device, e.g., a NAND flash memory in one embodiment. Although a NAND flash memory is described herein as an example, the embodiments of the present invention operate equally well with any sequential access memory storage device. The processor establishes an address window used as a cache (CW) in physical memory for reading data from the flash memory and also establishes a non-cacheable address window (NCW) in physical memory for performing commands, address delivery and writes to the flash memory. The NCW can be quite small, e.g., 1 byte wide as the flash memory can be accessed using a single address. The CW is sized to be larger than the processor data cache to ensure a large enough addressable space to allow the read process to assure cache coherency by assuring that reads from the flash memory always encounter a data cache-miss so that read data is obtained directly from the flash memory. In other words, data cache-hits are prevented. This ensures data coherency. By reading through the CW from the flash memory, e.g., by enabling the data cache for this physical address window, the processor takes advantage of bursting, pipelining and data prefetch efficiencies which significantly increase data throughput. In one embodiment, the size of the CW should be at least large enough to accommodate twice the size of the data cache plus one page-worth of data where the page size can be defined by the flash memory device. Of course, the CW may be larger than this size.

In one embodiment, the processor utilizes VLIO mode (variable 10 latency) for its CW to ensure that the output enable (OE) pin supplied to the flash memory is strobed during bursting and that minimum wait cycles are used. The OE line is strobed based on each address transition. This mode is established by the processor according to programming it performs with respect to its memory management unit (MMU). In accordance with embodiments of the present invention, conventional methods can be used for writing data to the flash memory.

More specifically, embodiments of the present invention are directed to a system comprising: a data storage device having sequential data access capability and requiring no separate address bus coupled therewith; and a processor coupled to the data storage device and comprising: an address window used as a cache for receiving data from the data storage device wherein a cache hit therein is prevented from occurring; and a non-cacheable address window for issuing commands to the data storage device, for supplying addresses to the data storage device and for issuing writes to the data storage device. Embodiments include the above and wherein the processor further comprises a data cache and wherein further the processor realizes data throughput efficiencies attributed to pipelining, data prefetch operations and bursting when receiving the data from the data storage device as a result of the data cache being enabled for the receiving.

Embodiments also include a method of transferring data between a processor and a data storage device comprising: a) establishing an address window used as a cache for receiving data from the data storage device; b) establishing a non-cacheable address for issuing commands to the data storage device, for supplying addresses to the data storage device and for issuing writes to the data storage device; and c) the processor receiving, via a burst operation, a plurality of data from the data storage device using the address window used as a cache, the receiving comprising: c1) the processor supplying a start address to the data storage device; c2) the processor issuing an instruction to receive the plurality of data from the data storage device; and c3) the processor incrementing a read pointer upon each data being received from the data storage device wherein a data cache-hit is prevented during the receiving. Embodiments include the above and wherein the data storage device has sequential data access capability and requires no separate address bus coupled therewith and wherein the processor comprises a data cache and wherein further the processor realizes data throughput efficiencies attributed to pipelining, data prefetch operations and bursting when receiving the plurality of data from the data storage device as a result of the data cache being enabled for the receiving.

Embodiments also include a method of transferring data between a processor and a flash memory device having sequential data access capabilities, the method comprising: a) establishing an address window used as a cache for receiving data from the data storage device wherein a data cache of the processor is enabled for the address window used as a cache; b) the processor receiving, via a burst operation, a plurality of data from the data storage device using the address window used as a cache, the receiving comprising: bi) the processor supplying a start address to the flash memory device; b2) the processor issuing an instruction to receive the plurality of data from the flash memory device; and b3) the processor incrementing a read pointer upon each data being received from the flash memory device and wherein a data cache-hit is prevented during the receiving. Embodiments include the above and wherein the processor realizes data throughput efficiencies attributed to pipelining, data prefetch operations and bursting when receiving the plurality of data from the flash memory device as a result of the data cache being enabled for the receiving.

DETAILED DESCRIPTION OF THE INVENTION

Reference will now be made in detail to the preferred embodiments of the present invention, a system and method optimizing data throughput to a processor from a storage device having sequential data access capabilities where the processor enables its data cache for memory accesses involving the storage device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Figure 1A:
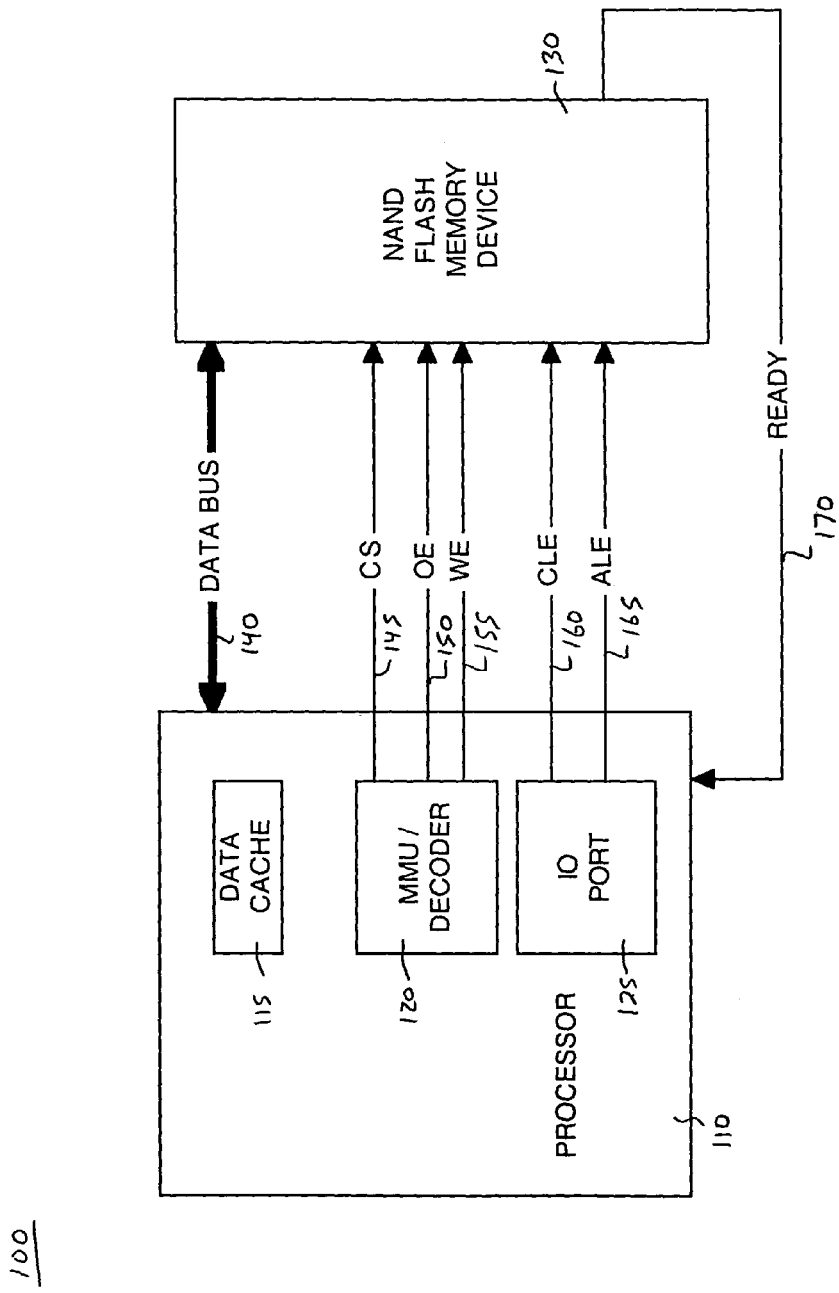
FIG. 1A illustrates a system implemented in accordance with an embodiment of the present invention including a processor and a memory storage device having sequential access thereto.

FIG. 1A illustrates a system 100 in accordance with an embodiment of the present invention and includes a processor 110 and a data storage device 130. The system 100 may be part of a general purpose computer system, an embedded system, a portable computer system, a consumer electronic system or device, a cellular phone, a remote control device, a game console, a digital camera system, etc.

Although any processor can be used, in one embodiment the Intel Px27Oxxx 5 type processor is used. The data storage device 130 has sequential data access capabilities (described below) and is sometimes referred to as a serial block device. Although different types of sequential data access memory devices can be used herein, a flash memory device is described as one example. In one implementation, a NAND flash memory device 130 may be used. The memory device 130 requires no separate address bus because address information is provided over the bi-directional data bus 140 (which is coupled to processor 110). It may take more than one clock cycle to supply a full address into the memory device 130 over the data bus 140. In one implementation, the data bus may be 8, 12 or 16 lines wide, but could be any width. If the data bus 140 is 8 bits wide, for example, it would take multiple clock cycles to supply a 16 or 24 bit address to the memory device 130.

A chip select CS line 145 is also coupled between memory device 130 and processor 110, as well as an output enable OE line 150, a write enable line 155, a command latch enable CLE line 160 and an address latch enable ALE line 165. The memory device 130 outputs a ready or "busy" line 170 back to the processor 110. As is well known, the CS line 145, when asserted, selects the memory device 130 when the appropriate address space is being used by the processor 110. The CS line 145 can be generated by the memory management unit (MMU) 120 of the processor 110, or could be generated by a function of one or more address lines from the processor's address bus. Alternatively, the CS line 145 could be directly controlled by software via the IO port circuitry 125 of processor 110. In this exemplary configuration, the CS line 145 is controlled by decoder logic within the MMU 120 as is well known.

It is appreciated that since memory device 130 has no separate address bus, and a single chip select line, it may be addressed by the processor using a single address value. However, embodiments of the present invention establish and use separate physical address windows for accessing memory device 130 as will be explained further below.

The OE line 150 and the WE line 155 are both controlled by the MMU 120 in this exemplary configuration of FIG. 1A, but could also be under direct software control via the IO port circuit 125. During reads, OE indicates to the memory device 130 that the processor 110 is ready to accept another data from it over the data bus 140. During writes, WE indicates to the memory device 130 that another data is provided on the data bus 140, from the processor, for writing into the memory device 130. It is appreciated that CS, OE and WE may be asserted high or low. When the memory device 130 is busy performing an operation, the ready line 170 is de-asserted.

Since the data bus 140 may have either address, data information or command information supplied thereon from the processor 110, special signals inform the memory device 130 of the type of information on the data bus 140. CLE indicates that the memory device 130 is receiving command information and ALE indicates that the memory device 130 is receiving address information. Typically a command is followed by an address, which commences the memory operation. For instance, the processor 110 may supply command information, e.g., read or write command, over data bus 140 and then assert the command, latch enable CLE line 160 to latch that command information into the memory device 130. Alternatively, the processor 110 may supply address information over the data bus 140 and then assert the address latch enable ALE line 165 to latch that address information into the memory device 130. Assertion of ALE typically commences the operation. Command and/or address information may be wider than the data bus 140 and, in this case, two or more clock cycles may be required to supply the command and/or address to the memory device 130. It is appreciated that CLE and ALE may be asserted high or low.

Memory device 130 offers sequential data access capabilities because once it receives a memory operation command, e.g., a read command, and also receives the start address for the read, e.g., A0, the memory device 130 will supply sequentially addressed data, e.g., A0, A1, A2, A3, A4, . . . , over the data bus 140 at the strobe rate of the OE line 150. This continues until completed or instructed to stop. Likewise, during a write, once it receives the write command, and also receives the start address for the write, e.g., A0, the memory device 130 will store sequentially addressed data, e.g., A0, A1, A2, A3, A4, . . . , received over the data bus 140 at the strobe rate of the WE line 155. This continues until completed or instructed to stop. It is appreciated that the memory device 130 has an internal address counter for performing the above memory operations.

As described further below, in accordance with embodiments of the present invention, the chip select mode of the MMU 120 corresponding to address window used as a cache 220 is programmed in variable input/output latency mode or VLIO when data is being read from the memory device 130. This means that the OE line 150 will be strobed for each address transition of the address bus (which corresponds to each new data of the data bus that is supplied by the memory device 130) and minimum wait cycles are used. It is appreciated that the processor 110 also includes a data cache memory 115.

Figure 1B:
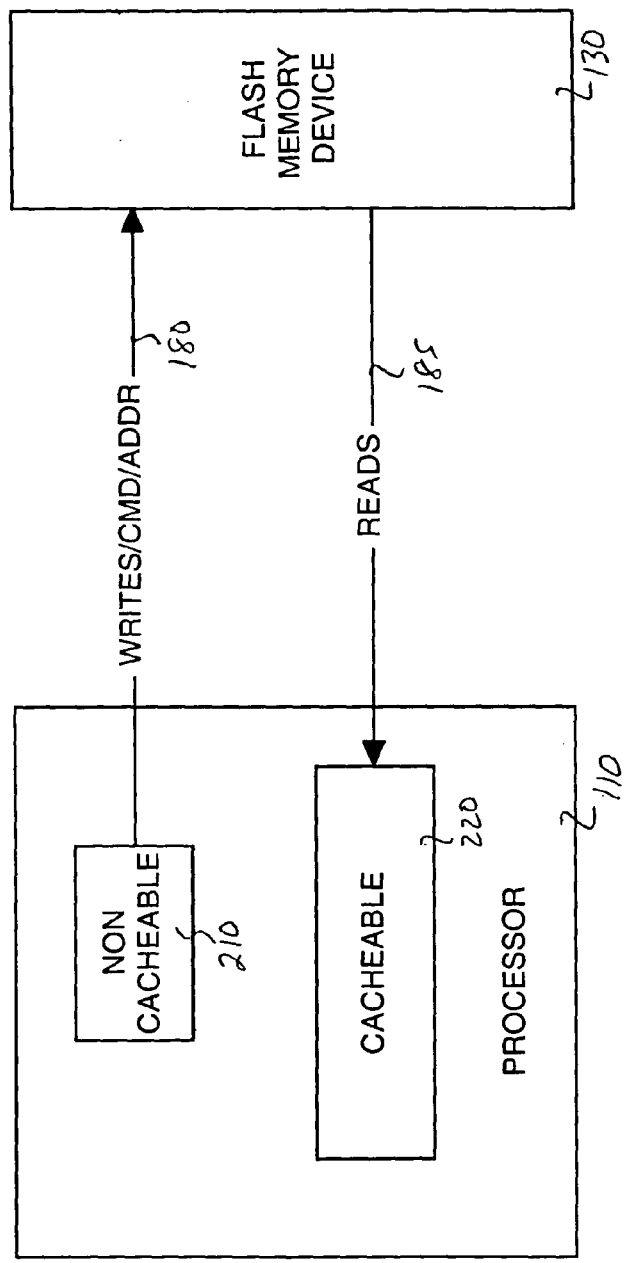
FIG. 1B is a diagram illustrating a processor performing functions with the memory storage device through an address window used as a cache and a separate non-cacheable address window in accordance with embodiments of the present invention.

FIG. 1B is a block diagram that illustrates the addressing scheme adopted by the present invention for accessing the memory device 130. Although device 130 may be addressed by a single address value or range, embodiments of the present invention define (e.g., in the MMU) two separate address space windows 210 and 220 for accessing memory device 130. In accordance with embodiments of the present invention, write operations, commands and addresses are issued through a non-cacheable physical address window 210, to the memory device 130 as shown by 180. This window 210 may be very small, e.g., on address value, but could be of any size. However, read operations 185 from the memory device 130 are performed using a physical address window used as a cache 220. Window 220 may also be bufferable.

Window 220 is sized to be larger than data cache 115 (FIG. 1A) to prevent any cache-hits during read operations from the memory device 130. In one implementation, window 220 is sized to be twice the size of the data cache 115. In another embodiment, window 220 should be at least twice the size fo the data cache plus the page size defined for the memory device 130. Cache-hits are prevented in order to maintain data coherency when reading from the memory device 130. However, the data cache is nevertheless enabled so that data throughput optimizations such as pipelining, data pre-fetch operations and bursting can be utilized by processor 110. While the data cache is enabled, the processor updates the read address pointer for each data read by the processor. When the end of window 220 is reached, the read address pointer is wrapped around back to the start of window 220. Although the data cache 115 is filled, its contents are never read by the processor 110 with respect to reads from the memory device 130. However, by enabling the data cache, processor 110 can implement burst read operations which read in multiple bytes of data from memory device 130, from multiple addresses, using only a single bus access request operation. In one embodiment, 32 bytes of data can be read by processor 110 in a burst read operation using only a single bus access request. This dramatically increases data read throughput over the prior art which requires one bus access request per byte obtained from memory device 130.

Figure 2:
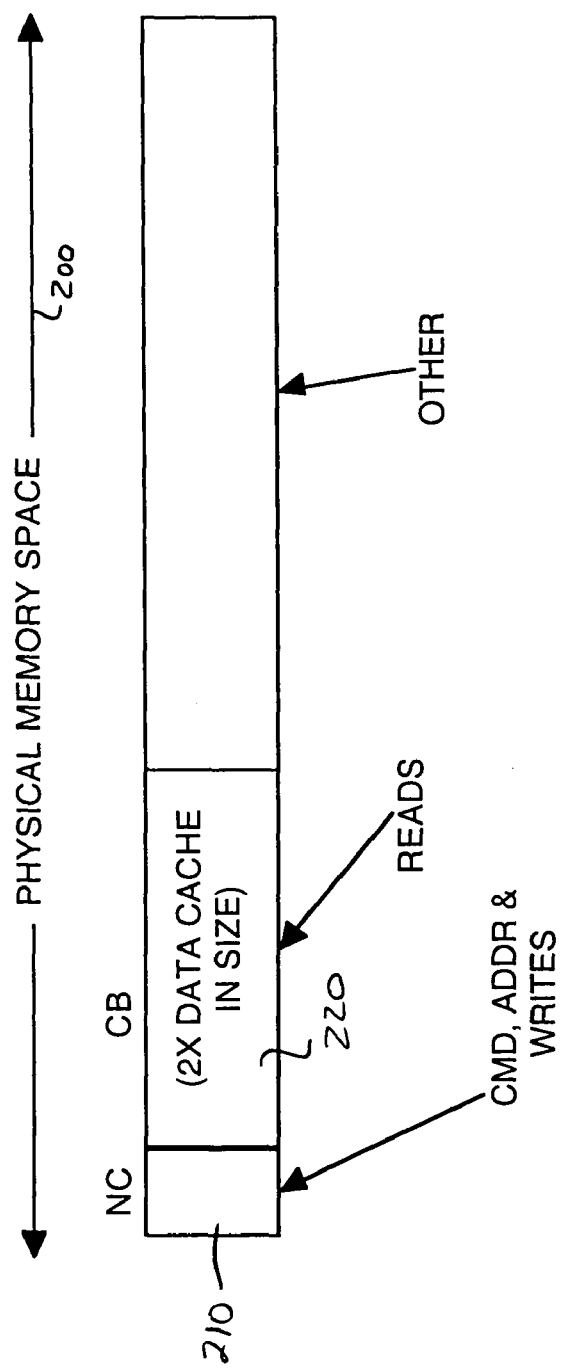
FIG. 2 is a diagram of the address window used as a cache and a separate non-cacheable address window used by the processor in accordance with embodiments of the present invention.

FIG. 2 illustrates a portion of the mapping of the physical address space 200 of processor 110. In one embodiment, this may be 64 Megabytes, but could be any length. Shown are the non-cacheable address window 210 (NC) and the address window used as a cache or buffer 220 (GB). It is appreciated that the address space of memory device 130 may be much larger than the size of the address window used as a cache 220. In this case, the read address pointer of window 220 performs a wrap-around function when it reaches the window end during reads. It is appreciated that defining an address window uses as a cache within processor 110 means that whenever the processor accesses addresses within this window, the data cache 115 (FIG. 1 A) will automatically be enabled.

In one embodiment, windows 210 and 220 are defined by programming of the MMU 120 of processor 110. Typically, for each window, a mapping is given between the corresponding virtual and physical addresses, a window length is provided and certain parameters or attributes are established. Attributes indicate to the processor whether or not to enable the data cache for a select window and informs the processor of other definitions of the space. Table I illustrates an exemplary configuration (or MMU program) that can be used to establish windows 210 and 220 of FIG. 2.

TABLE I

| Physical Address | Virtual Address | Length | Attributes |
|---|---|---|---|
| 0 - | 0xC0000000 | 0x100000 | NC (VLIO) |
| 0x100000 - | 0xC0100000 | 0x100000 | CB (VLIO) |

In the case illustrated in Table I, the first page table entry defines non-cacheable window 210 and the second entry defines address window used as a cache 220. It is appreciated that for the address window used as a cache 220, VLIO mode is enabled. This will strobe the OE line for each address transition of the address bus which corresponds to each new data provided by the memory device 130.

Figure 3:
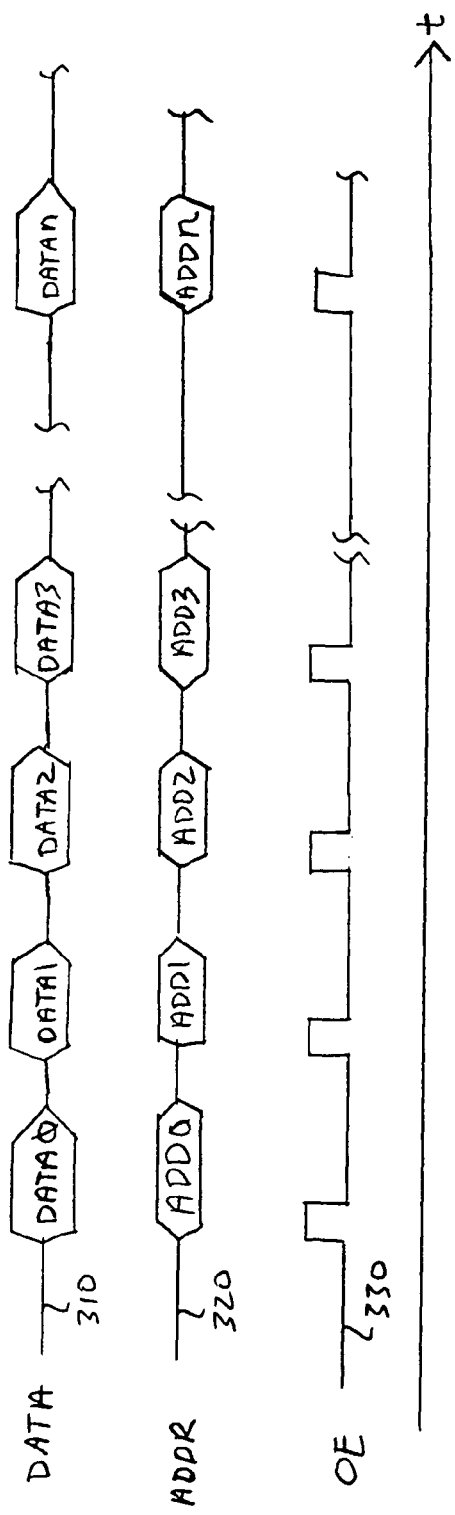
FIG. 3 is a timing diagram of a burst mode read from the flash memory using the cacheable window in VLIO mode in accordance with embodiments of the present invention.

FIG. 3 illustrates timing diagrams for an exemplary read operation. Timing diagram 330 represents the strobing of the output enable OE line when the MMU is programmed for VLIO mode with respect to the chip select range associated with window 220. Timing diagram 320 illustrates the read addresses (of the address bus) which are incremented by the processor 110 during a read operation but are not actually supplied to memory device 130 because it requires no address bus. Memory device 130 need only be supplied with the start address, ADD0. Timing diagram 310 illustrates the data bus 140. As shown, in accordance with the present invention, in VLIO mode, the OE line is strobed upon each transition of the address bus which corresponds to each data supplied by memory device 130 onto the data bus 140.

Figure 4:
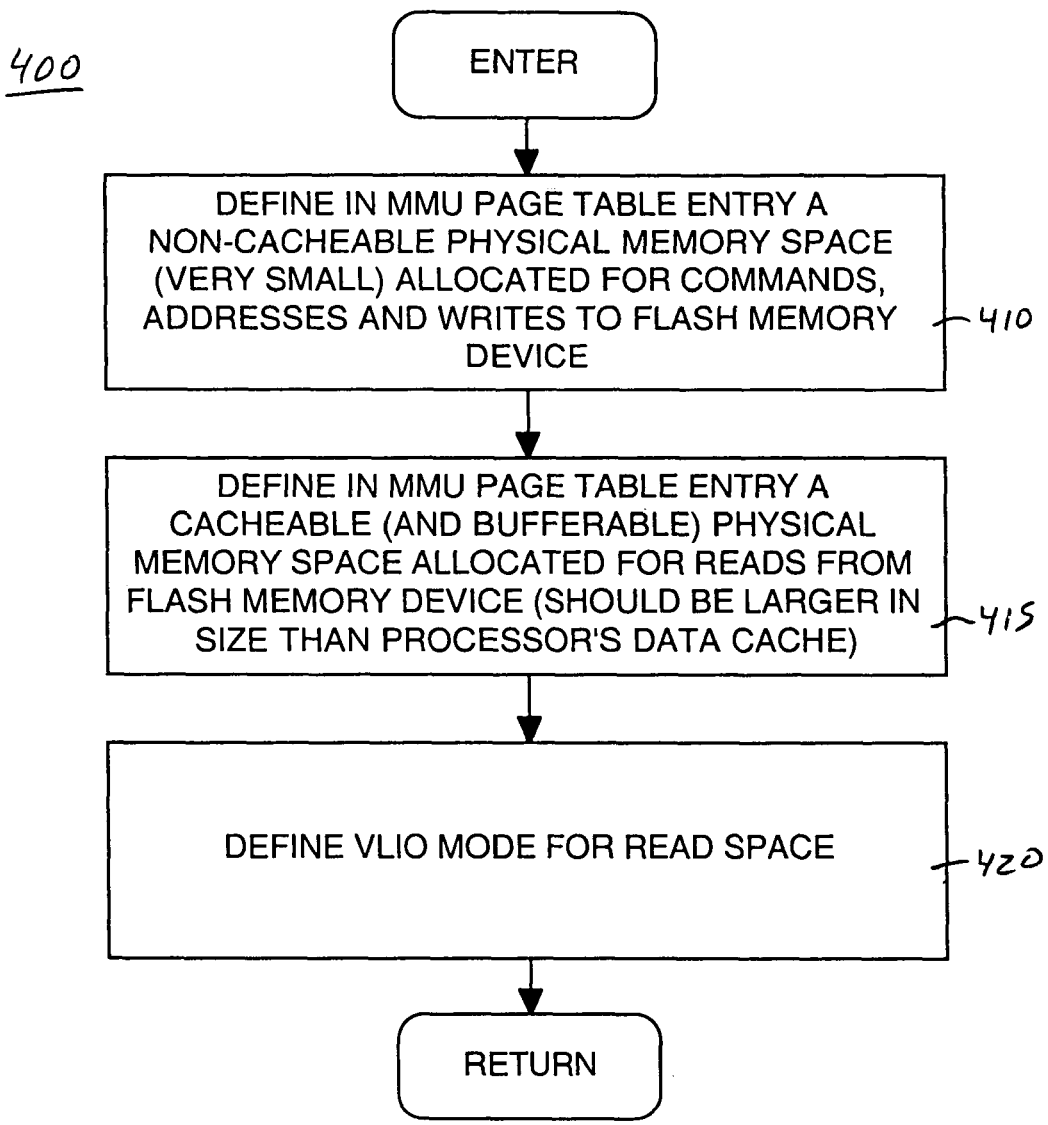
FIG. 4 is a flow diagram of a processor for defining, in its memory management unit, the address window used as a cache and the non-cacheable address window in accordance with embodiments of the present invention.
Figure 5:
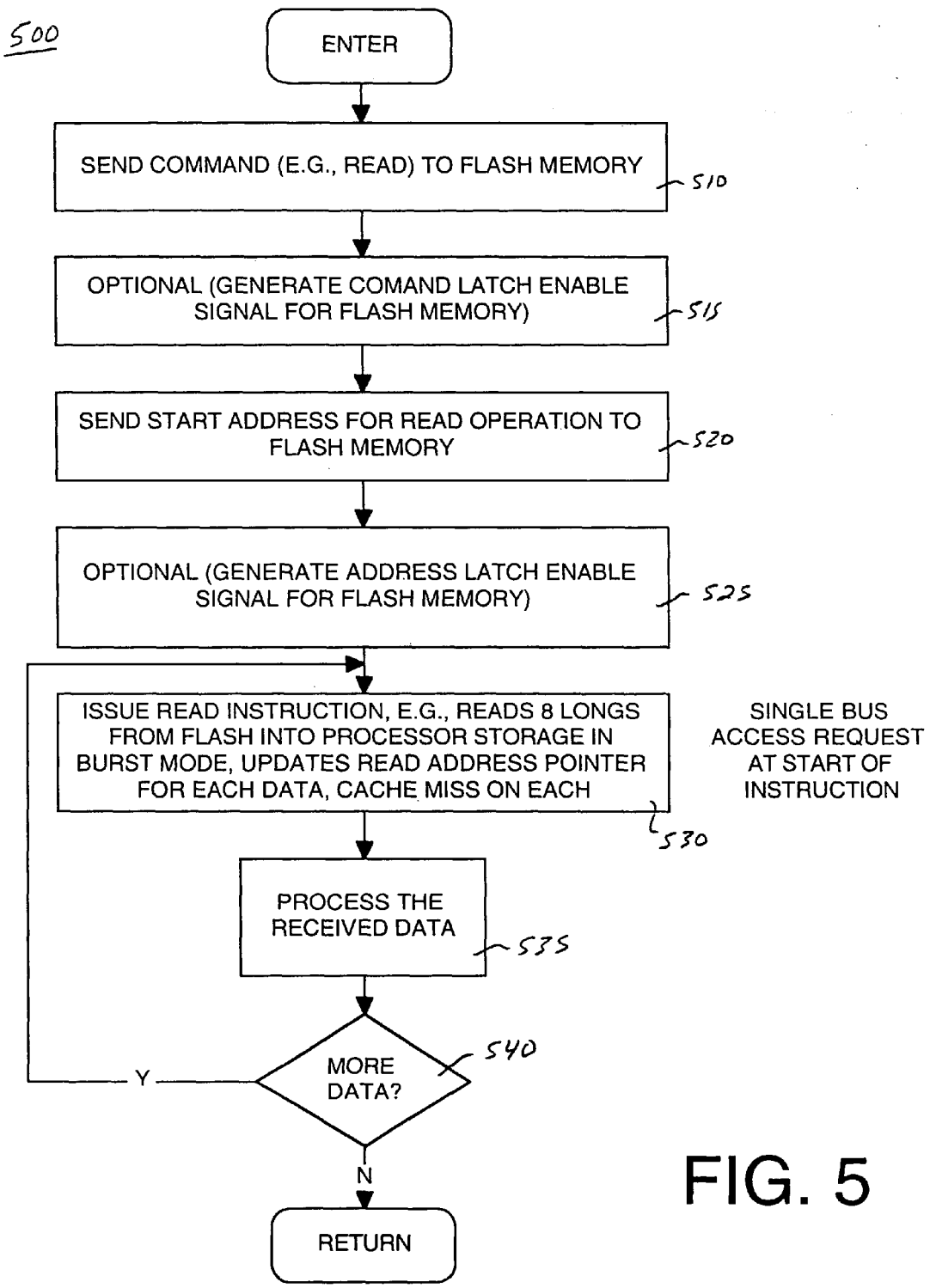
FIG. 5 is a flow diagram of a processor implementing a method of efficiently reading data from the flash memory through its data cache while maintaining data coherency in accordance with embodiments of the present invention.

FIG. 4 and FIG. 5 illustrate flow charts of processes 400 and 500 performed by the processor 110 in accordance with embodiments of the present invention. FIG. 4 illustrates the steps required for establishing the address spaces ("windows") of FIG. 2 and FIG. 5 illustrates steps performed in an exemplary read operation from memory device 130.

At step 410 of FIG. 4, the processor defines a page table entry within the MMU for the non-cacheable physical address memory 210. This can be a very small window, e.g., one byte, or larger. Window 210 is allocated for write operations, commands and addresses with respect to the memory device 130. At step 415, the processor defines another page table entry of the MMU for the address window used as a cache 220 which is allocated for reads to the memory device 130. This window 220 is set to be larger than the data cache 115 to prevent any data cache hits during reading operations. In one embodiment, window 220 is sized to be twice the length of the data cache 115 and at least one page size as defined by the memory device 130. At step 420, the chip select range associated with the address window used as a cache 220 is set to VLIO mode so that the OE line is strobed as shown in FIG. 3. It is appreciated that the steps of process 400 can be performed in any order.

Process 500 of FIG. 5 illustrates an exemplary method of reading a large buffer from memory device 130, e.g., a 2 kilobyte buffer, for instance. At step 510, processor sends a read command over data bus 140 to memory device 130. At step 515, the processor 110, via software control asserts the CLE signal line to latch in the command information. Alternatively, if the CLE signal line is tied to an appropriate address line, then steps 510 and 515 may be performed simultaneously where the CLE line is asserted by activity within a certain range of the address bus. At step 520, the processor 110 then sends the start address for the desired buffer to the memory device 130 using the data bus 140. At step 525, the processor 110, via software control asserts the ALE signal line to latch in the start address information. Alternatively, if the ALE signal line is tied to an appropriate address line, then steps 520 and 525 may be performed simultaneously where the ALE line is asserted by activity within a certain range of the address bus. At this point, the memory device 130 is ready to supply sequential data starting from the loaded address. At step 530, the processor 110 issues a read command, for instance the below load instruction format can be used:

LDMIA R0!, {R1-R8}

This load instruction reads 8 longs (e.g., 4 bytes) starting from the read address pointer defined by register R0 and increments the read address pointer after each data. The data is placed into the indicated registers. The read address pointer, R0, is defined to be within the address window used as a cache 220 which automatically enables the data cache 115. At the start of the instruction, the processor executes a bus access request. When bus access is granted, this instruction will perform a burst read operation obtaining 32 bytes of sequentially stored data from the memory device 130. Since the VLIO mode is enabled, the OE line is strobed as each data is placed on the data bus. Data throughput optimizations of pipelining, data prefetch and bursting are enabled because the data cache is enabled for this instruction. If the read pointer, RU, exceeds the window 220, it is wrapped around to the start of window 220. By using the instruction format above, fewer bus access requests are required. If the data cache was disabled, no instruction pipelining or data prefetch operations would be performed.

By allowing a burst read instruction which obtains multiple bytes of data for a single bus access request, the present invention dramatically increases data throughput on reads from the memory device 130. Data coherency is also maintained because data cache-hits are prevented; by the time the read pointer wraps around within window 220, the data cache is guaranteed to be flushed with new data that does not correspond to the previous read address values. Since data hits are prevented, all data is obtained directly from the flash memory 130, and not from the data cache.

At step 535 of FIG. 5, the received data is processed by processor 110. At step 540, a check is made if the entire buffer has been obtained yet. If there is still more bytes to obtain, then step 530 is repeated and another 32 bytes of data is obtained and another bus access request is generated. If the buffer has been completely read, then process 500 terminates. It is appreciated that obtaining 32 bytes per instruction is merely exemplary and fewer or more bytes can be obtained per instruction depending on the format of the instruction used and the size of the data word or byte to be obtained.

Figure 6:
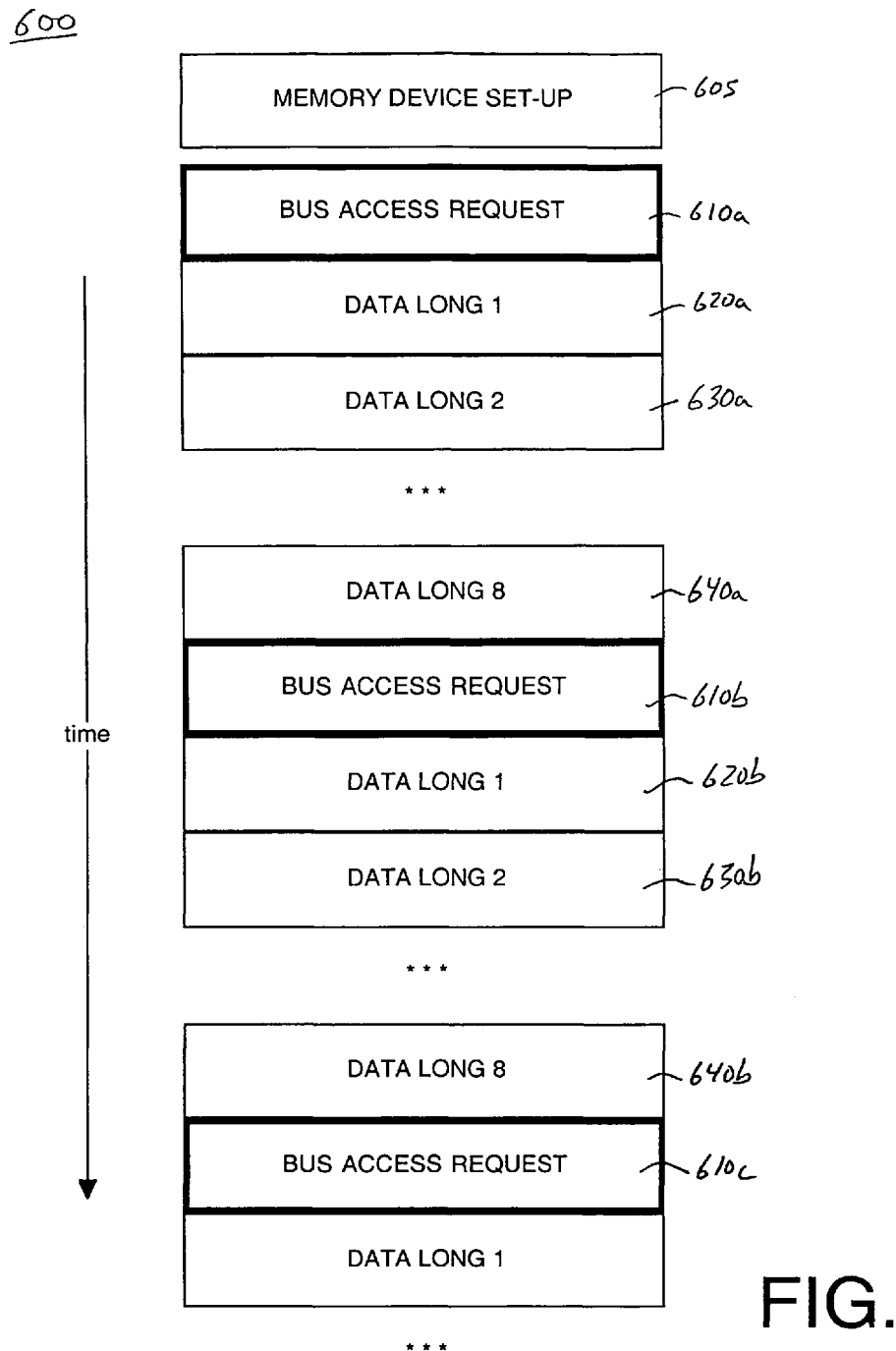
FIG. 6 is a diagram illustrating the relatively few occurrences of bus access requests by the processor with respect to many occurrences of received read data over several bursting operations in accordance with embodiments of the present invention.

FIG. 6 illustrates a timing block diagram 600 of the buffer being read from memory device 130 in blocks of 8 longs according to FIG. 5. The read operation command and start address are supplied to the memory device 130 at 605. These functions consume a relatively small amount of cycles over the entire buffer read operation and the data cache is disabled at 605. The data cache is enabled at the start of 610a. The first block is 610a-640a. Bus access request 610a is followed by a burst read of long1 620a through long8 640a. A subsequent bus access request 610b is generated for long1 620b through long8 640b which are also obtained using a burst read operation. This process repeats until the entire buffer is read from memory device 130 according to the steps of FIG. 5. Memory device set-up does not need to be repeated for each block.

Figure 7A:
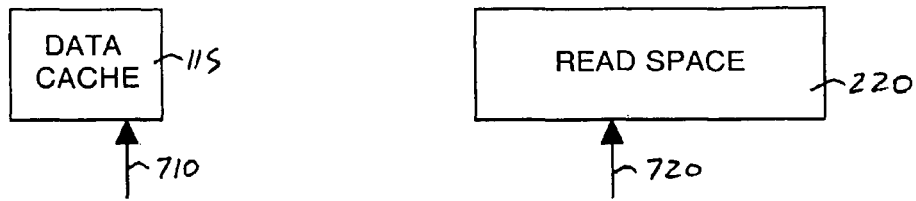
FIG. 7A, FIG. 7B and FIG. 7C illustrate the operation of the read data pointer and data cache pointer which prevents data cache hits during read bursting in accordance with embodiments of the present invention.
Figure 7B:
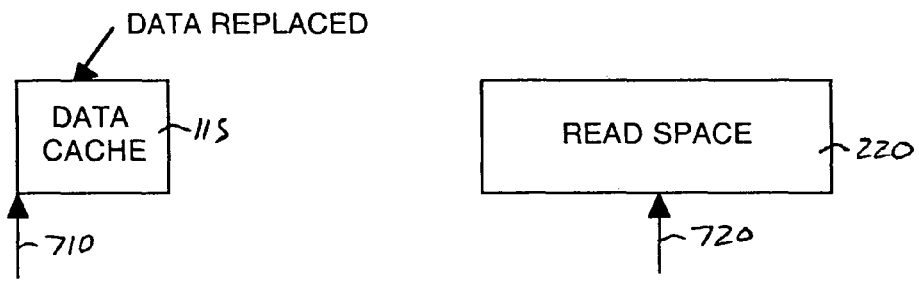
Figure 7C:
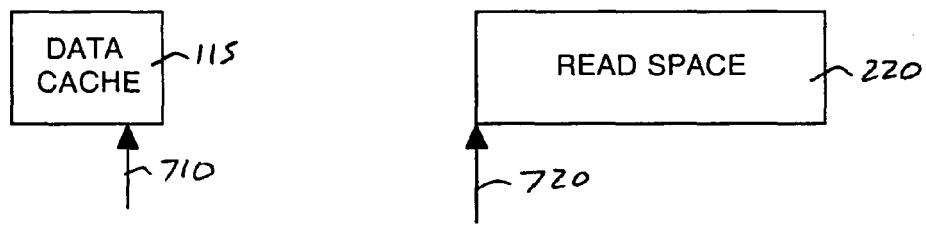

FIG. 7A, FIG. 7B and FIG. 7C are diagrams which illustrate the operation of the read pointer 720 and the data cache pointer 710 during a typical read operation in accordance with embodiments of the present invention. The exemplary operation illustrates how data cache-hits are prevented during read operations by appropriate sizing of the address window used as a cache 220 and data cache 115. FIG. 7A illustrates the read pointer's first pass through window 220. Data is being cached into data cache 115 at pointer 710. FIG. 7B illustrates that pointer 710 wraps around to re-use its buffer contents (LRU replacement) while read pointer 720 is still in its first pass through window 220. FIG. 7C illustrates that by the time read pointer 720 wraps-around window 220, the previous read data that was cached (corresponding to this address) had been overwritten at least once by the data cache 115. Since this is the case, no data cache-hits are possible during a data read operation in accordance with the embodiments of the present invention.

The foregoing descriptions of specific embodiments of the present invention, a system and method optimizing data throughput to a processor from a storage device having sequential data access capabilities where the processor enables its data cache for memory accesses involving the storage device, have been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:
a data storage device having a sequential data access capability and requiring no separate address bus coupled therewith; and
a processor coupled to said data storage device and comprising:
a data cache, wherein said data cache is enabled during read operations from said data storage device, and wherein said data cache is operable to receive sequentially read data from said data storage device during a read operation and further operable to sequentially store said sequentially read data;
a cacheable address window at least twice the size of said data cache plus a page size defined for said data storage device for receiving data from said data storage device, wherein a read pointer associated with said cacheable address window is incremented upon each data being received and said data cache is flushed upon said read pointer associated with said cacheable address window wrapping around said cacheable address window; and
a non-cacheable address window for issuing commands to said data storage device, for supplying addresses to said data storage device and for issuing writes to said data storage device.

2. A system as described in claim 1 wherein said processor realizes data throughput efficiencies attributed to pipelining, data prefetch operations and bursting when receiving said data from said data storage device as a result of said data cache being enabled for said receiving.

3. A system as described in claim 1 wherein said data storage device comprises a NAND flash memory device and wherein said NAND flash memory device is coupled to said processor via a data bus which is used by said processor for supplying addresses to said NAND flash memory device.

4. A system as described in claim 3 wherein said data cache is enabled for memory read operations from said data storage device using said cacheable address window and wherein further said cacheable address window is programmed for VLIO data access mode.

5. A system as described in claim 1 wherein said data cache is enabled for memory read operations from said data storage device using said cacheable address window and wherein further said cacheable address window is programmed for VLIO data access mode.

6. A method for transferring data between a processor and a data storage device comprising:
receiving sequentially read data, via a burst operation, at a data cache of said processor from said data storage device during a read operation, wherein said data cache is enabled during read operations from said data storage device;
storing said sequentially read data at said data cache;
establishing a cacheable address window at least twice the size of said data cache plus a page size defined for said data storage device for receiving data from said data storage device; and
establishing a non-cacheable address window for issuing commands to said data storage device, for supplying addresses to said data storage device and for issuing writes to said data storage device, wherein said receiving comprises:
supplying a start address;
issuing an instruction to receive said plurality of data associated with said start address; and
incrementing a read pointer upon each data being received, wherein said data cache is flushed upon said read pointer wrapping around said cacheable address window.

7. A method as described in claim 6 wherein said data storage device has sequential data access capability and requires no separate address bus coupled therewith.

8. A method as described in claim 6 wherein said processor realizes data throughput efficiencies attributed to pipelining, data prefetch operations and bursting when receiving said plurality of data from said data storage device as a result of said data cache being enabled for said receiving.

9. A method as described in claim 6 wherein said data storage device comprises a NAND flash memory device and wherein said NAND flash memory device is coupled to said processor via a data bus which is used by said processor for supplying addresses to said NAND flash memory device.

10. A method as described in claim 9 wherein said data cache is enabled for memory read operations from said data storage device using said cacheable address window and further comprising said processor programming said cacheable address window for VLIO data access mode.

11. A method of transferring data between a processor and a flash memory device having a sequential data access capabilities, said method comprising:
- receiving sequentially read data, via a burst operation, at a data cache of said processor from said flash memory device during a read operation, wherein said data cache is enabled during read operations from said flash memory device;
- storing said sequentially read data at said data cache;
- establishing a cacheable address window at least twice the size of said data cache plus a page size defined for said flash memory device for receiving data from said flash memory device; and
- establishing a non-cacheable address window for issuing commands to said flash memory device, for supplying addresses to said flash memory device and for issuing writes to said flash memory device, wherein said receiving comprises:
  - supplying a start address;
  - issuing an instruction to receive said plurality of data associated with said start address; and
  - incrementing a read pointer upon each data being received, wherein said data cache is flushed upon said read pointer wrapping around said cacheable address window.

12. A method as described in claim 11 wherein said flash memory device has no separate address bus coupled therewith and wherein said start addresses is supplied via a data bus coupled between said processor and said flash memory device.

13. A method as described in claim 11 wherein said processor realizes data throughput efficiencies attributed to pipelining, data prefetch operations and bursting when receiving said plurality of data from said flash memory device as a result of said data cache being enabled for said receiving.

14. A method as described in claim 11 further comprising a said processor programming said cacheable address window for VLIO data access mode wherein an output enable pin coupled to said flash memory device is strobed during said receiving.

15. A memory device comprising stored instructions that when executed by a processor implement a method of transferring data between said processor and a data storage device, said method comprising:
- receiving sequentially read data, via a burst operation, at a data cache of said processor from said data storage during a read operation, wherein said data cache is enabled during read operations from said data storage device;
- storing said sequentially read data at said data cache;
- establishing a cacheable address window at least twice the size of said data cache plus a page size defined for said storage device for receiving data from said data storage device; and
- establishing a non-cacheable address window for issuing commands to said data storage device, for supplying addresses to said data storage device and for issuing writes to said data storage device, wherein said receiving comprises:
  - supplying a start address;
  - issuing an instruction to receive said plurality of data associated with said start address; and
  - incrementing a read pointer upon each data being received, wherein said data cache is flushed upon said read pointer wrapping around said cacheable address window.

16. A memory device as described in claim 15 wherein said data storage device has sequential data access capability and requires no separate address bus coupled therewith.

17. A memory device as described in claim 15 wherein said processor realizes data throughput efficiencies attributed to pipelining, data prefetch operations and bursting when receiving said plurality of data from said storage device as a result of said data cache being enabled for said receiving.

18. A memory device as described in claim 15 wherein said data storage device comprises NAND flash memory device and wherein said NAND flash memory device is coupled to said processor via a data bus which is used by said processor for supplying addresses to said NAND flash memory device.

19. A memory device as described in claim 18 wherein said data cache is enabled for memory read operations from said data storage device using said cacheable address window and further comprising said processor programming said cacheable address window for VLIO data access mode.

* * * * *